No. 635,509. Patented Oct. 24, 1899.
G. ROWE & J. TRUNNEL.
CIRCULAR SAW.
(Application filed Apr. 26, 1897.)
(No Model.)
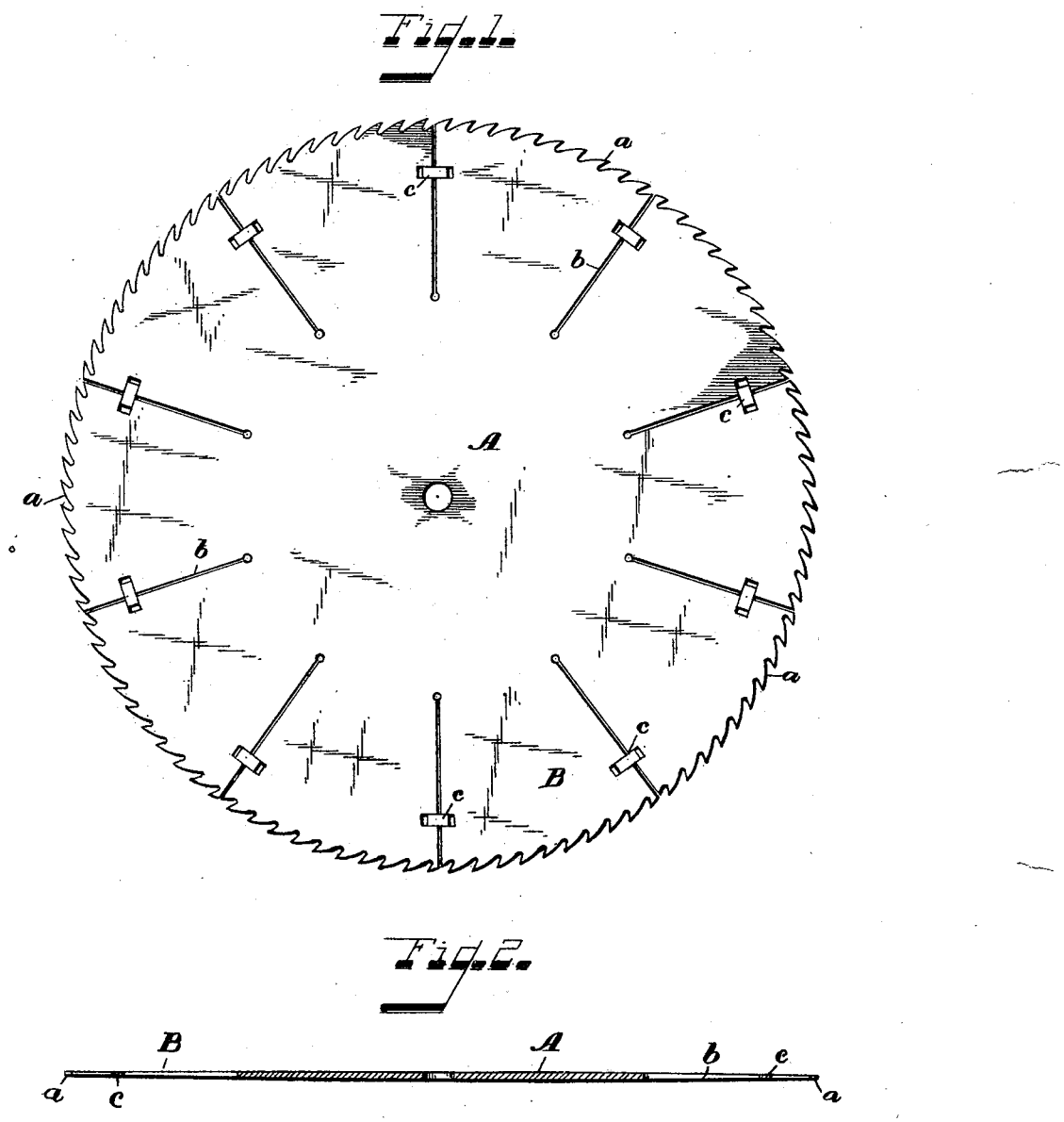
Witnesses
Bernard J Hauszfeld
H. G. Edwards.
Inventors
George Rowe
James Trunnel
by Alfred M. Allen
Attorney
THE NORRIS PETERS CO., PHOTO-LITHO., WASHINGTON, D. C.

UNITED STATES PATENT OFFICE.

GEORGE ROWE AND JAMES TRUNNEL, OF CINCINNATI, OHIO.

CIRCULAR SAW.

SPECIFICATION forming part of Letters Patent No. 635,509, dated October 24, 1899.

Application filed April 26, 1897. Serial No. 633,888. (No model.)

*To all whom it may concern:*

Be it known that we, GEORGE ROWE and JAMES TRUNNEL, citizens of the United States, residing at Cincinnati, in the county of Hamilton and State of Ohio, have invented certain new and useful Improvements in Circular Saws, of which the following is a full, clear, and exact description, reference being had to the accompanying drawings, forming part of this specification.

As is well known in the art, one of the main difficulties in the use of circular saws is that of maintaining the tension of the saw to compensate for the expansion due to the centrifugal motion. For the varying velocities for the different qualities of the wood acted upon and for the different temperatures generated by friction in the material the tension required in the saw is never entirely uniform, and therefore a much higher degree of skill is required to handle the saw for the different resistances of the varying character of the lumber to be cut than would be required if the saw could be made sufficiently thick to be perfectly stout and rigid and still allow the saw free passage through the wood. With the ordinary circular saw of the requisite thinness the sawyer, unless particularly skilled, finds the saw-teeth meet with different resistances on its two sides. The saw dishes under the tension and jumps from one side to the other, so that it is difficult to handle the work. In order to overcome these difficulties and provide a circular saw which should be sufficiently stout and rigid for the use of ordinary mechanics, it has long been customary to manufacture segment or flanged circular saws, which consist of a complete series of saw-segments riveted or screwed to central flanges. While these segment-saws are sufficiently rigid, the flanges themselves take up so much space that another difficulty arises. With such saws, say, of thirty-six inches in diameter the flanges make the central portion of the saw an inch in thickness. As the saw passes through the material the kerf must widen to allow for the passage of the flange, and as a result the rear portion of the lumber is very apt to split open before being reached by the saw. This is the most serious objection to the flanged saws. Another is that only a few inches of the saw can be used and worn down when the saw has to be thrown away. After a few times of retoothing and repairing the saw is worn away up to the flanges and is of no further use. It is the purpose of our invention to overcome these objections to the segment-saw by obtaining the advantages of the solid saw as regards wear and allowance of the free passage of the lumber and at the same time retain the good qualities of the segment-saw as regards stiffness and rigidity and convenience in handling by the ordinary workman. This we accomplish by the construction of saw to be hereinafter more particularly pointed out and claimed.

In the drawings, Figure 1 is a plan view of our improved circular saw. Fig. 2 is a central section of same.

The saw is formed out of a solid plate of properly-tempered steel, with the usual teeth *a a* cut on the periphery. Instead, however, of having an even gage throughout the central section A is considerably thicker than at the rim B. This central section is in diameter preferably about one-third of the diameter of the saw and tapers out to the required gage for the rim. The amount of taper and the thickness of the central section of course depend on the diameter of the saw and the character of the work for which it is constructed.

For a saw, say, thirty-six inches in diameter we prefer to have the central section, say, one-quarter inch in thickness and twelve inches in diameter. The taper then begins and tapers down to the required gage for the rim. The saw thus far, however, would still be open to the difficulties incident to the ordinary solid circular saws of even gage throughout, as above set forth.

In order to prevent the saw from becoming rim-bound when in use and to gain the advantages incident to the use of segment-saws, we then form radial slots *b b* in the saw from the periphery inward, say, a little less than a quarter of the diameter of the saw, thus dividing the web of the periphery into partial segments. The slots are of course very narrow—say one-sixteenth of an inch for a thirty-six-inch saw—and they extend inward toward the center for such a saw about eight inches, the inner end of the slot being rounded out to prevent cracking or splitting. The number of the slots is not material, providing a sufficient number are formed to gain the effect at the rim of the segment-saws. We have found that, say, ten equidistant radial slots are sufficient for a thirty-six-inch saw such as is illustrated in the drawings. To prevent the segments of the rim from being sprung out of place and to hold them properly together, we insert strips of copper $c\ c$ between the cut edges of the saw, leaving an open space at each end of the copper piece to allow for expansion, as is also customary in the flanged segment-saws in common use.

We are aware that it is old in the art to cut radial slots from the eye or mandrel opening at the center outward a short distance in the ordinary solid circular saw and that this was supposed to obviate many of the difficulties incident to the use of the solid saw; but for the ordinary class of work to be handled by the ordinary workman this saw lacks sufficient rigidity, and, besides, this saw is weakest at the center, where it should be strongest.

The advantages of our saw will be obvious. The saw combines the advantages of the integral saw with those of the segment-flanged saw, but without the objections incident to the latter class.

The gage of our saw at the center is not so great as to cause the lumber to split as the saw passes through same, while the ability to expand at the rim obtained by the division of the web at the periphery, combined with the rigidity and stiffness at the center, furnishes a saw which can be used by the ordinary workman without special care and attention. In addition to this it is evident that our saw can be worn down and repaired until it is entirely used up, while with the flanged saw, which it is intended to supersede, after an inch or so is worn off the saw-teeth come too close to the flange to allow for any further utility in the saw. The extra expense of the flanges and the extra work of riveting or screwing the segment-plates to the flanges are also a matter of considerable advantage in the use of our improved saw.

Having thus described our invention, what we claim, and desire to secure by Letters Patent, is—

1. As a new article of manufacture, an integral circular saw, having its web thickened at the center and tapering to proper gage, provided with a divided web at the rim to form substantial segments, as described.

2. As a new article of manufacture, an integral circular saw, having its web thickened at the center and tapering to proper gage, provided with a divided web at the rim to form substantial segments, said segments being connected by metallic strips inserted between the edges thereof to support and sustain same, substantially as shown and described.

GEORGE ROWE.
JAMES TRUNNEL.

Witnesses:
BERNARD J. HAUSFELD,
H. G. EDWARDS.